UNITED STATES PATENT OFFICE.

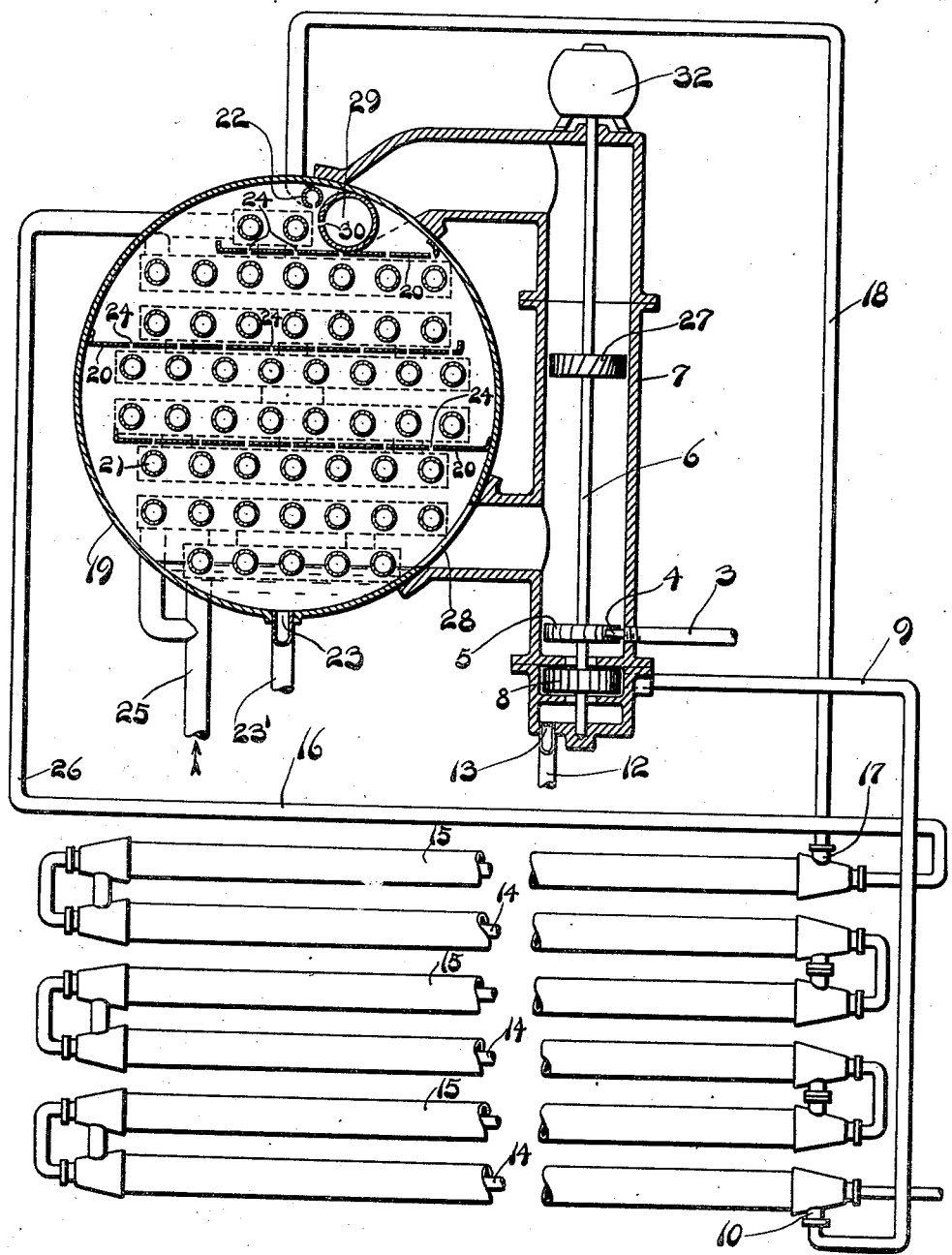

THOMAS C. McKEE, OF CHICAGO, ILLINOIS, ASSIGNOR OF ONE-THIRD TO GEORGE H. KITTREDGE AND ONE-THIRD TO PAUL W. LAMSON, OF CINCINNATI, OHIO.

ABSORBER FOR REFRIGERATING APPARATUS.

1,085,624.     Specification of Letters Patent.     Patented Feb. 3, 1914.

Application filed September 18, 1912. Serial No. 720,931.

*To all whom it may concern:*

Be it known that I, THOMAS C. McKEE, a citizen of the United States of America, and resident of Chicago, county of Cook, and State of Illinois, have invented certain new and useful Improvements in Absorbers for Refrigerating Apparatus, of which the following is a specification.

This invention relates to absorption refrigerating apparatus and particularly to absorbers forming a part of such apparatus.

An object of this invention is to produce an absorber in which means are employed for reducing the amount of ammonia gas employed, the amount of power necessary for circulating the aqua ammonia, or absorbing liquor, and the amount of heat for distillation, per ton of refrigeration below that ordinarily employed in refrigerating apparatus now in use.

A further object is to produce an absorber in which means are employed for increasing the heat transferring capacity or the radiating value of the radiating surface beyond that usually obtained in absorbers, and in which means are also employed for so utilizing the cooling water that the temperature of the aqua ammonia, or absorbing liquor, is reduced to substantially the temperature at which the cooling water enters the absorber.

A further object is to produce a multi-stage absorber higher in efficiency and more effective in operation than those now in use or known to me.

These and other objects I attain in an apparatus embodying the features herein described and illustrated in the drawings accompanying and forming a part of this application.

In the drawings, I have somewhat diagrammatically illustrated a three-stage absorber, which forms an embodiment of my present invention, and in which portions are shown broken away and in section for convenience of illustration.

The absorber, illustrated as an embodiment of my invention, includes three separate stages, an initial stage or primary absorber, a second stage or secondary absorber, and a third stage or final absorber.

The initial stage or primary absorber includes a mixer and impeller, which is operated by the pressure energy of the weak absorbing liquor, entering the absorber from the generator, and which initially mixes the liquor with the ammonia, or gas to be absorbed, received from the cooler or the expansion chamber, and delivers the mixture to the inlet of the secondary absorber. As illustrated, the secondary absorber is of the double tube type and receives the hot liquor under pressure from the impeller. The liquor and the cooling water pass through the secondary absorber in opposite directions, so that the hottest liquor is subjected to the cooling effect of the cooling water leaving the absorber, and the liquor leaving the absorber is subjected to the cooling effect of the water entering the absorber. The liquor leaving the secondary absorber is delivered to the final absorber, in which it is divided into a mass of drops by a series of baffle plates or trays and in which it is exposed to the cooling effect of coils, through which the cooling water flows prior to being introduced into the secondary absorber. The coils and baffle trays are so arranged that the liquor flows through the final absorber in a substantially opposite direction to the flow of cooling water and as it leaves the absorber is subjected to the cooling effect of the coldest water; that is, the water entering the absorber. In addition to this the free ammonia gas in the final absorber is caused to circulate in a zigzag or circuitous course across the baffle trays and cooling tubes located within the absorber. This circulation of the free ammonia is maintained, in the apparatus illustrated, by a fan or blower which, like the mixer and impeller, receives power from the liquor entering the primary absorber.

The liquor from the generator (not shown) is delivered through a pipe or passage 3 and the nozzle 4 to the rotor element 5 of a water turbine, which is preferably of the impulse type. The pressure of the liquor in the generator is relatively high, and, under ordinary conditions, the liquor in an apparatus of one hundred (100) tons refrigerating capacity should develop about five horse power with a turbine or water wheel of ordinary efficiency. The rotor 5 of the turbine is mounted on, and drives a shaft 6, which extends longitudinally through a cylindrical casing 7. The casing 7 incloses the rotor 5 and also the rotor element of a centrifugal pump 8, which is also mounted on the shaft 6. The pump 8 is preferably located below the turbine or water wheel, so that the liquor delivered from the turbine falls into the suction of the pump, and the pump is so constructed that it is capable of delivering the liquor through a pipe or passage 9 to the inlet 10, of the secondary absorber. Free ammonia gas is delivered, from the cooler, or the expansion chamber (not shown) to the suction of the pump 8 through a pipe or passage 12, the delivery end of which is preferably covered by a perforated plate or screen 13. The pump 8, in addition to delivering the liquor to the secondary absorber, also intimately mixes the liquor and the ammonia gas, delivered from the pipe 12, and consequently delivers the mixture to the secondary absorber. The pump is preferably of such capacity that it is capable of delivering more liquor than is discharged from the turbine and consequently alternate slugs of liquor and gas are delivered by it to the secondary absorber.

The mixing of the gas and liquor within the pump passages greatly increases the temperature of the liquor and consequently the hottest liquor issues from the pump and enters the inlet 10 of the secondary absorber. The secondary absorber, as illustrated, consists of a series of double pipes through the inner pipes 14, of which, the cooling water flows, and through the outer pipes of which the aqua ammonia or absorbing liquor flows. With such an arrangement the efficiency of the absorber is materially increased over those usually employed, since the inner cooling pipes 14 are surrounded by the liquor to be cooled, and since the liquor in the outer pipes 15 is subjected to the cooling effect of the atmosphere as well as of the inner pipes. The secondary absorber receives cooling water from the final absorber through a pipe or passage 16 and the connections of the cooling pipes 14 are such, that the cooling water flows through the absorber in the opposite direction to the flow of liquor. With this arrangement the hot liquor entering the absorber is exposed to the cooling effect of the cooling water leaving the absorber while the cooler liquor leaving the absorber is exposed to the cooling effect of the cooler water entering the absorber. The liquor is therefore cooled to substantially the temperature of the cooling water and consequently the amount of water, at a given temperature, necessary to produce the decrease in temperature of the liquor, is much less than that necessary in the absorbers ordinarily employed. The water wheel or turbine also eliminates difficulties ordinarily encountered, and resulting from the pounding of the liquor from the generator, as it enters the absorber. The turbine abstracts the pressure from liquor and converts it into useful and available energy.

After the liquor has circulated through the secondary absorber it is delivered, through the outlet 17 and a pipe or passage 18 to the third stage or final absorber. As illustrated, the final absorber comprises a tubular shell or casing 19, a series of baffle trays 20, and a plurality of cooling tubes 21.

The pipe 18 terminates in a header 22, which is located near the top of the casing 19, extends longitudinally of the casing, and is provided with a discharge slot located above the upper baffle tray 20. The casing is provided with a liquor discharge port 23, which is preferably located at the lowest point of the casing and communicates through a pipe or passage 23' with a pump or other means for delivering the liquor to the generator. The series of trays 20 is located between the header 22 and the outlet port 23, and each tray is perforated, so that the liquor falling through the casing is divided into a mass of separate drops.

The cooling tubes 21 extend longitudinally through the casing, and are arranged in horizontally alined series. The tubes of each horizontal series communicate with transversely extending headers, located at opposite ends of the casing 19 and adjacent headers are preferably connected together, so as to form sets of two series each through, which the cooling water flows in the same direction. The cooling water is delivered to the lowest set of tubes 21 through a branched pipe or passage 25, which communicates with the headers of that set of tubes located at one end of the casing. The headers of the lowest set of tubes located at the other end of the casing may be connected together, and are preferably so connected to the adjacent headers of the next lowest set of tubes, that the water flows in an opposite direction through the next lowest set from that in which it flows through the lowest set. This method of connecting the tubes together is preferably employed throughout the absorber, so that the cooling water travels first in one direction and then in the other, as it passes through the tubes 21, and is finally delivered through a pipe or passage 26, to the secondary absorber.

The tubes in the upper portion of the casing 19 are preferably so located that one series of each set is located above one of the trays 20, while the other series of the set is located immediately below the tray. Each tube of the lower series of each set is preferably located immediately below an alined series of apertures 24, formed in the adjacent tray and it is also preferably located immediately above one of the tubes of the set next below. With this arrangement the liquor discharged from the header 22 is distributed by the upper tray 20 and, percolating through the apertures 24 in the tray, is divided into a mass of separate drops, which fall first on one series of cooling tubes and then on the series next below, and finally onto the second tray 20 of the series. This is repeated until the liquor reaches the bottom of the casing 19.

I have also provided means for increasing the cooling effect of the tubes, and for thereby obtaining a stronger liquor than is ordinarily obtained. The means employed in the illustrated embodiment of the invention is a fluid impeller, such as the blower or fan 27, which is located within the casing 7 and is mounted on the shaft 6. The casing 7 communicates with the casing 19 through a port 28, located near the bottom of the casing 19, and through a header 29, located near the top of the casing, and which is provided with a gas discharge slot 30. The fan or blower 27 is actuated by means of the water wheel or turbine 5 and operates to draw gas out of the casing 19, through the port 28 and to return the gas to the casing through the header 29 and the slot 30. The slot 30 is located below the liquor discharge slot or orifice, in the header 22, in such a position that the liquor issuing from the header falls over it and is broken, by the current of gas, into a mass of separate drops or spray, which is caught by the upper tray and is delivered to the outlet port by the successive trays in the manner above described. The trays 20 are so located that they cause the gas issuing from the nozzle to flow in a zigzag path through the casing 19. This is accomplished by securing alternate trays to opposite sides of the casing and by so proportioning the width of each tray that it extends almost entirely across the casing. With such an arrangement the gas issuing from the slot 30 is caused to pass in one direction over the top tray of the series and is then reversed in its flow at the free edge of the tray and is caused to pass in the opposite direction over the second tray of the series, each tray acting as a baffle and reversing the direction of flow. The liquor in each tray is thus exposed to the current of gas passing over the tray and the wet cooling tubes and the drops of liquor falling from one tray to another are subjected to the current of gas passing between adjacent trays. This increases the cooling effect of the tubes and also the gas absorption capacity of the liquor. By admitting the cooling water to the lowest set of tubes the liquor leaving the casing through the port 23 is subjected to the cooling effect of the coldest water and consequently may be cooled to substantially the temperature of the water as it enters the absorber.

As illustrated, the port 28 is so located that it forms an over-flow port for the liquor located in the bottom of the casing, as well as a gas delivery port. With this arrangement liquor will flow through the port 28, back into the suction of the pump 8, and, mixing with the hot liquor, be again delivered to the secondary absorber, if the liquor collects in the lower part of the casing 19 faster than it is discharged from the port 23.

It will be understood that various means may be employed for abstracting the pressure energy from the liquor entering the primary absorber and for mixing the liquor with the ammonia gas. If the energy abstracted from the entering liquor is not sufficient to mix the gas and liquor and to deliver the mixture under sufficient head to the secondary absorber, auxiliary means, such for example as an electric motor 32 may be employed for driving the shaft 6. The motor may be so arranged that it will operate continuously in conjunction with the turbine, or during periods when the turbine is incapable of producing sufficient power.

While I have illustrated and described my invention in accordance with the requirements of the patent statutes, I desire it to be understood that the details of construction may be materially varied and that various changes, modifications and substitutions may be made in the apparatus illustrated without departing from the spirit and scope of my invention as set forth in the appended claims.

What I claim is:

1. In an absorber, a casing having an inlet port and an outlet port for the absorbing liquor, cooling tubes located within the casing and means for creating a flow of gas within the casing.

2. In combination in an absorber, a casing having an inlet port, an outlet port for the absorbing liquor and means actuated by the flow of absorbing liquor for creating a current of gas through the casing.

3. In combination in an absorber, a casing having an inlet and an outlet port for absorbing liquor and a fluid impelling means actuated by the absorbing liquor for creating a flow of gas through the casing.

4. In combination in an absorber, a casing having an inlet port and an outlet port for absorbing liquor, means for cooling the absorbing liquor and means actuated by the absorbing liquor for creating a flow of liquor through the casing and for setting up gas currents within the casing.

5. In an absorber, a casing having an inlet and an outlet port for absorbing liquor, liquor cooling means located within the casing, a passage communicating at both ends with the casing and a fluid impeller located within the passage for creating currents in the gas located within the casing.

6. In an absorber, a casing having an inlet and an outlet port, an absorbing liquor, cooling means within the absorber, means for creating a flow of gas through the casing, baffles located between the inlet and the outlet ports for impeding the flow of liquor through the casing and for directing the flow of gas therethrough.

7. In an absorber, a casing having an inlet and an outlet port for absorbing liquor, cooling means located within the casing, a fluid impeller for creating currents in the gas within the casing, means for impelling the absorbing liquor through the casing and means actuated by the pressure energy of the absorbing liquor entering the absorber for actuating the fluid impeller and the liquid impelling means.

8. In an absorber, a casing having an inlet and an outlet port for absorbing liquor, cooling means within the absorber, means for creating a flow of gas through the casing and perforated trays located between the inlet and outlet ports for separating the flow of liquor into a mass of separate drops and for directing the flow of gas within the casing.

9. In an absorber, a mechanically actuated agitator for gas and absorbing liquor, a blower for circulating the gas to be absorbed within the absorber and means actuated by the absorbing liquor for driving said agitator and said blower.

10. In combination with a multi-stage absorber, a stage including a mechanically actuated liquor impeller for delivering liquor to the communicating stages of the absorber and for impelling it therethrough, a blower for circulating gas to be absorbed within the absorber and means actuated by the absorbing liquor entering the absorber for driving the impeller and the blower.

11. In a multi-stage absorber, mechanically actuated means for mixing the liquor and the gas to be absorbed and for impelling the liquor through the communicating stages, a blower for circulating gas within the absorber, means actuated by the pressure energy of the liquor entering the absorber for driving said liquor mixing and impelling means and said blower and means for maintaining a flow of cooling liquid through the communicating stages of the absorber in an opposite direction to the flow of liquor.

12. An absorber, comprising, a double tube absorber having an inlet for cooling water, at the liquor outlet end thereof and an outlet for cooling water at the liquor inlet end thereof, a final stage, means for delivering liquor from the liquor outlet of the double tube absorber to the liquor inlet of the final stage and means for delivering cooling water from the water outlet of the final stage to the water inlet of the tube absorber.

13. In combination in an absorber, an agitator for mixing absorbing liquor and gas to be absorbed, means for actuating the agitator and means for cooling the mixture leaving the agitator.

14. In combination in an absorber, a pump for mixing absorbing liquor and gas to be absorbed, a casing to which said mixture is delivered after leaving the pump, and an overflow passage for the casing, communicating with the inlet of the pump.

15. In combination in an absorber, a pump for mixing absorbing liquor and gas to be absorbed, and for delivering the mixture to a casing including cooling means therefor, a casing to which the mixture is delivered, having an overflow port formed therein and in communication with the inlet end of the pump, and means, actuated by the absorbing liquor, entering the absorber, for driving the pump.

16. In an absorber, a casing having an inlet and an outlet port for absorbing liquor, cooling means for the liquor, located within the casing, fluid impelling means for creating currents in the gas within the casing, a pump for mixing gas to be absorbed and absorbing liquor and for impelling the absorbing liquor through the casing, means actuated by the absorbing liquor entering the absorber, for actuating the fluid impeller and the pump, and means for delivering overflow liquor from the casing to the pump.

17. In combination in an absorber, a casing having an inlet port and an outlet port for absorbing liquor, means for cooling the liquor passing through the casing, and means for creating a flow of gas through the casing and across said cooling means.

18. In combination with an absorber, mechanically actuated means for mixing absorbing liquor and gas to be absorbed, and for impelling the mixture through the absorber, means for circulating the gas through the absorber, and means for actuating the mixing and the circulating means.

19. In combination in an absorber, a pump for mixing absorbing liquor and gas to be absorbed and for impelling the mixture through the absorber, a turbine driven by the absorbing liquor entering the absorber, for actuating the pump, and cooling means for receiving the mixture delivered by the pump.

20. In a multi-stage absorber, a pump for mixing absorbing liquor and gas to be absorbed and for impelling the liquor through communicating stages of the absorber, a blower for circulating gas within one stage of the absorber, a turbine actuated by the pressure energy of the liquor entering the absorber, for driving the pump and the blower, and cooling tubes within the absorber, through which the cooling liquid flows in an opposite direction to the flow of absorbing liquor.

21 In a multi-stage absorber, a pump for mixing absorbing liquor and gas to be absorbed and for impelling the mixture through the communicating stages, a blower for circulating gas within the absorber, means actuated by the energy of the liquor entering the absorber, for driving the pump and the blower, auxiliary means for driving the pump and the blower, and means for introducing cooling liquid into the absorber.

THOS. C. McKEE.

Witnesses:
 JESSE F. KENNEDY,
 WM. M. WALKER.